Dec. 21, 1954 H. T. LAMB 2,697,464
PEELING ATTACHMENT FOR DOMESTIC MIXING MACHINES
Filed Nov. 15, 1951

Inventor
Harold Thomas Lamb
By
Alexander Dowell
Attorneys

United States Patent Office 2,697,464
Patented Dec. 21, 1954

2,697,464

PEELING ATTACHMENT FOR DOMESTIC MIXING MACHINES

Harold Thomas Lamb, Benton, Newcastle upon Tyne, England

Application November 15, 1951, Serial No. 256,445

Claims priority, application Great Britain September 26, 1950

3 Claims. (Cl. 146—49)

This invention relates to domestic mixing machines of the kind comprising a rotatable bowl, means for rotating the bowl and a swinging arm from which depends a dolly spindle for co-operating in the bowl to effect mixing.

The object of the invention is to provide a simple and inexpensive device for attaching to the machine for peeling vegetables such as potatoes.

The device according to the invention comprises a spindle adapted at its upper end to be detachably rigidly attached to the dolly spindle, an outwardly declined disc rigidly mounted on the lower end of said spindle, the upper surface of said disc being provided with an abrasive surface, a cylindrical member adapted for detachable positive engagement with the mixing bowl, said cylindrical member adapted to co-operate with said disc so that when the bowl is rotated with vegetables therein a combined rumbling and abrasive action is carried out on the vegetables which as a result rapidly lose their skins.

The invention will now be described by way of example with reference to the accompanying drawings which show a form particularly adapted for use with the mixing machine described in my co-pending U. S. patent application No. 170,622 now Patent No. 2,608,941 issued September 2, 1952.

Referring more particularly to the drawings, 1 is the rotary mixing bowl which is rotated by a vertical motor driven shaft covered by a skirt projecting downwards from the lower face of the bowl 1 having an internally toothed rim 2 at its upper end, and 3 is the swinging arm from which depends the spring pressed dolly spindle 4.

Figure 2:
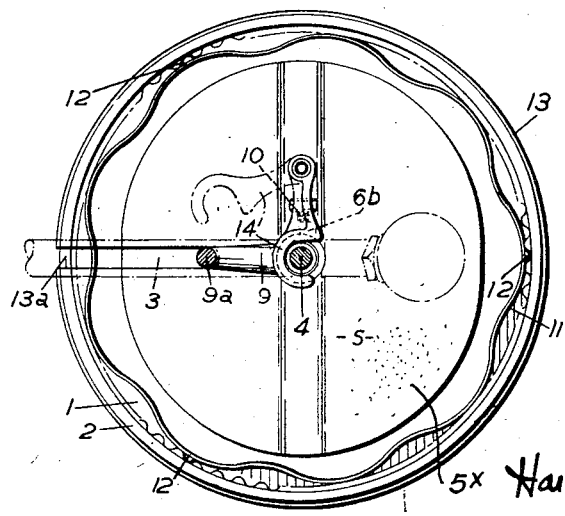
Fig. 2 is a plan of Fig. 1.

5 is an abrasive disc bent diametrally to the shape shown in Fig. 2. This disc is of stainless steel which has been sprayed on its upper surface with stainless steel so as to present an abrasive surface 5. The disc 5 is clamped against a shoulder 6a on the lower end of a vertical spindle 6 whose lower extremity is reduced to receive a nut 7 and washer 8 on the underside of the disc.

The upper end of the vertical spindle 6 is enlarged and is bored to be a sliding fit over the dolly spindle 4. At the uppermost end of the enlarged portion of the spindle there projects from one side a short horizontal arm 9 having an upwardly bent portion 9a which is adapted to project into a recess 3a formed on the under side of the swinging arm 3. At right angles to the horizontal arm 9 is a boss 6b in which is a clamping screw 10 for holding the vertical spindle 6 in position on the dolly spindle 4, which has a recess on its side for engagement with the end of the screw 10.

11 is a cylindrical grater member of corrugated form and of stainless steel which has been sprayed with stainless steel to form abrasive projections 11x thereon. Equally spaced around the outer wall of the cylinder are a number of projections 12 which are shaped to engage the toothed annulus 2 on the upper portion of the bowl. The lower portion of the cylindrical grater 11 extends to the radius at the lower portion of the bowl.

A cover disc 13 of transparent material having a radial slot 13a is adapted to be passed over the bowl 1 and about the rebated upper end of the spindle 6, a swivel hook 14 serving to maintain the disc in position.

With this arrangement, when it is desired to peel potatoes, the cylindrical grater 11 is placed in the bowl which has a little water poured into it to prevent the shavings from flying about; the dolly spindle 4 is drawn up; the abrasive disc 5 and spindle 6 introduced into the bowl 1; and, when under the dolly spindle 4, the latter is allowed to pass into the upper portion of the spindle 6 which is positioned so that the lateral arm 9 engages in the recess 3a in the swinging arm 3, in which position the clamping screw 10 is brought opposite the recess in the dolly spindle 4, and turned to hold the disc in position. The potatoes are deposited in the bowl to a depth sufficient to enable the rumbling action to take place, e. g., a third of the depth of the bowl, the transparent disc 13 placed over the bowl and locked in position. As a result of the rotation of the bowl 1 and cylinder 11 relatively to the disc 5, the potatoes are subjected to a rumbling action and as their sides are scraped by the cylinder and the disc, peeling takes place.

Figure 1:
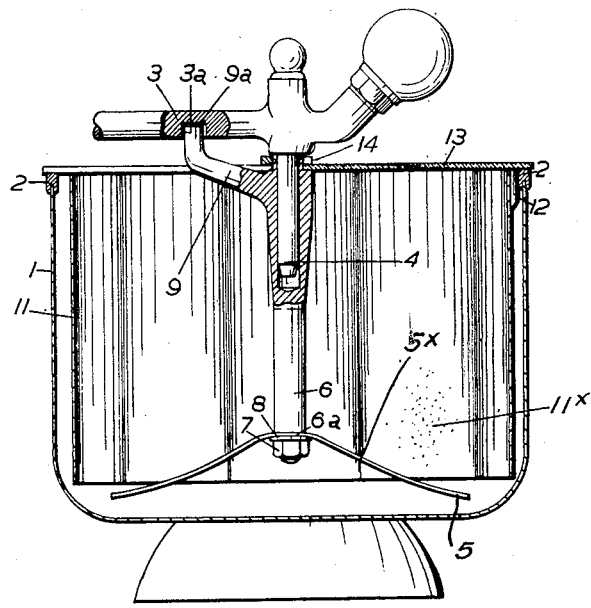
Fig. 1 is a diametrical sectional elevation of the bowl and a portion of the swinging arm with the spindle and disc shown in elevation.
Figure 3:
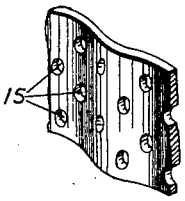
Fig. 3 is a fragmentary perspective view of an alternative form of cylindrical member.

The abrasive surface may take other forms, such as perforated metal with projecting portions such as the well known forms of grater, Carborundum, or metal perforated with holes 15 such as shown in Fig. 3, the edges of the holes 15 providing the abrasive means.

Instead of the abrasive cylinder being corrugated its inner face may be plain with teeth or serrations cut in it; or it may be fluted with teeth or serrations formed on the ridges of the flutings.

The attachment may be used for peeling or scraping other vegetables such as carrots and turnips.

What I claim is:

1. A vegetable peeling attachment for use on a domestic mixing machine of the kind described including a swinging arm carrying a dolly spindle, said arm overlying a rotary mixing bowl, and means for rotating said bowl, a support for said arm and bowl; the said attachment comprising a spindle adapted at its upper end to be detachably and rigidly attached to the dolly spindle, an outwardly declined disc rigidly mounted on the lower end of said spindle the upper surface of said disc being provided with an abrasive surface, a cylindrical member within the bowl adapted for detachable positive engagement with the mixing bowl, said cylindrical member being adapted to co-operate with said disc so that when the bowl is rotated with vegetables therein a combined rumbling and abrasive action is carried out on the potatoes which as a result rapidly lose their skins.

2. An attachment according to claim 1, wherein a recess is provided in the swinging arm, an arm extending laterally and upwardly from the vertical spindle, said arm being adapted to engage in said recess, and means for clamping said vertical spindle on the dolly spindle.

3. An attachment according to claim 1, wherein the disc has portions deflected downwardly about one of its diameters.

References Cited in the file of this patent

UNITED STATES PATENTS

| Number | Name | Date |
|---|---|---|
| 999,478 | Archer | Aug. 1, 1911 |
| 1,304,716 | Struzas et al. | May 27, 1919 |
| 1,728,846 | Westgaard | Sept. 17, 1929 |
| 1,966,501 | Hoes | July 17, 1934 |
| 2,407,819 | Dolan | Sept. 17, 1946 |
| 2,442,600 | Horton | June 1, 1948 |
| 2,613,712 | Pearlman | Oct. 14, 1952 |
| 2,633,884 | Carlstedt | Apr. 7, 1953 |